UNITED STATES PATENT OFFICE.

THEODOR E. BREYER, OF WAUKEGAN, ILLINOIS.

PROCESS OF MANUFACTURING CATTLE FOOD.

No. 920,108.  Specification of Letters Patent.  Patented May 4, 1909.

Application filed June 23, 1905. Serial No. 266,674.

*To all whom it may concern:*

Be it known that I, THEODOR E. BREYER, a citizen of the United States, residing at Waukegan, county of Lake, State of Illinois, have invented a certain new and useful Improvement in Processes of Manufacturing Cattle Food, and declare the following to be a full, clear, and exact description of the same, such as will enable others skilled in the art to which it pertains to make and use the same.

My invention relates in general to cattle food, and more particularly to a process for manufacturing the same from by-products resulting from the manufacture of starch from corn.

In the manufacture of starch from Indian corn, the corn is first softened, preparatory to grinding, by steeping the same in a dilute solution of sulfurous acid. After the corn is ground it is mixed with water and the hulls and germs separated from the liquid. The liquid, known in the art as starch milk, is caused to flow over inclined tables upon which the starch is deposited while the gluten passes from the tables in the liquid.

Natural ingredients of the corn possessing valuable nutritive properties for cattle food, such as phosphates, potassium salts, albuminoids, sugar and other carbo-hydrates are dissolved during the steeping operation and remain in the steep water. It is customary to utilize in making cattle food the bran and gluten which constitute the insoluble by-products resulting from the manufacture of starch from corn, but the soluble by-products remaining in the steep water have usually been wasted owing to the impracticability of recovering them by evaporation by reason of the steep water containing substances which cause it to foam over and which also coat the coils and heating surfaces of the evaporating apparatus thereby necessitating the cleaning of the apparatus so frequently as to interfere with economical evaporation.

The primary object of my invention is to provide a process by the practice of which cattle food may be made from the soluble as well as the insoluble by-products resulting from the manufacture of starch from corn.

A further object of my invention is to provide a practical and economical process of recovering soluble by-products of corn from steep water.

Broadly considered, my invention consists in recovering soluble by-products of corn from steep-water by effecting a precipitation of those substances which would interfere with concentration through evaporation, the precipitation being produced by means of a neutralizing agent, preferably while the steep-water is heated; removing and recovering the precipitate; and then concentrating the remaining liquid to the consistency of syrup. The precipitate and concentrate may be mixed with other food products the whole being then dried and ground to reduce it to commercial form.

In carrying out my invention I add a neutralizing agent to the steep water resulting from immersing corn in a dilute watery solution of sulfurous acid and by heating such solution to a temperature of 120 to 130 degrees F. I may employ any suitable neutralizing agent such as caustic or carbonate of an alkaline earth or the carbonate of an alkali, in such proportions as to precipitate such substances as phosphate of lime, magnesia, iron, aluminum and albuminoids. While I do not of course wish to limit myself to any particular quantity of the neutralizing agent to be added to the steep water, yet in practice I have found that good results may be obtained by adding to 1000 gallons of steep water $12\frac{1}{2}$ lbs. of caustic soda, or 20 lbs. of soda ash, or 20 lbs. of carbonate of lime, or 15 lbs. of slaked lime.

In neutralizing the steep water which contains acid sulfites, sulfurous acid, and acid phosphates of calcium and magnesium, the acid phosphates are transformed into more neutral phosphates which are not soluble and are therefore precipitated. The albuminoids, kept in solution in the steep water by the weak acids and acid salts, are neutralized and the protein substances are thrown down as precipitate. In case carbonate of soda is employed the above described re-actions take place under the formation of soluble sodium phosphate and other sodium salts. The steep water also contains albuminoids which are precipitated by neutralizing the acid salts above mentioned and also contains other albuminoids which are precipitated by heating the liquid.

By heating up the steep water certain substances not precipitated by the neutralizing agent are rendered insoluble and they are therefore precipitated, the action of the chemicals is accelerated and the physical properties of the precipitate are changed in such a manner as to render it in a flocculent form, which permits a rapid separation of the precipitate from the liquid part by filtration. It is therefore preferable to heat the steep water at this stage of the process.

In addition to the neutralizing agent, I also preferably add to the steep water an oxidizing agent of alkaline reaction such as hypo-chlorite of calcium, sodium, or potassium, in order that the sulfites may be transformed into sulfates. The sulfites are by some considered objectionable in cattle food and the oxidizing agent is therefore added to remove them, but they are not injurious to the cattle in the small quantities present in the cattle food, and the adding of the oxidizing agent is therefore not essential in order that a wholesome cattle food may result. When an oxidizing agent is used it is added in suitable quantity to the steep water, such for instance as 12 lbs. of commercial hypo-chlorite of calcium or a corresponding amount of the hypo-chlorates of the alkalies to 1000 gals. of steep water.

After the precipitate has been formed, it is filtered from the liquid by any suitable filtering device and is obtained as a mass of whitish color containing valuable nutritive substances which may be used for enriching wet feed, which is the material remaining in a filter press from a mixture of bran and gluten, or brewers' slop, or beet cosettes. The liquid remaining after the removal of the precipitate is then evaporated which may be accomplished without difficulty to a syrup of from 30 to 40 degrees Bé. Foaming over of the mass in the evaporator and coating the heating surfaces of the evaporating apparatus, difficulties always encountered when an attempt is made to evaporate steep water, are entirely avoided owing to the fact that the substances which cause such difficulties have been removed in the form of precipitates prior to the evaporation.

The syrup obtained by evaporating the liquid remaining after the removal of the precipitates may be used to enrich wet feed obtained as a by-product in the manufacture of starch, or to enrich brewers' slop, or extracted beet cosettes. Preferably, however, the syrup is mixed with the precipitate obtained as above described and the resulting mixture used to enrich feed such as those mentioned. When the concentrates and syrup are mixed with wet feed the resulting mixture is dried and subsequently ground preparatory to being packed and shipped to places where it is to be used to feed cattle.

Ordinary steepwater contains in each gallon 0.4 to 0.5 pounds of dry substance, and between .008 to 0.010 pounds of sulfurous anhydrid. The composition of this dry substance is:

| | |
|---|---|
| Mineral matter | 17.02% |
| Nitrogen substance | 41.40% |
| Carbohydrates, etc | 41.58% |

The mineral matter is composed as follows:

| | |
|---|---|
| Iron oxid and alumina | 1.86% |
| Magnesium oxid | 17.74% |
| Calcium oxid | 3.84% |
| Phosphoric anhydrid | 44.50% |
| Potash and soda as chlorids | 32.00% |

After the albuminous precipitate is removed from the liquid the liquid contains, besides carbo-hydrates, all the potash salts and albuminous matter not precipitated, and also sulfites. In the following process of evaporation these sulfites are decomposed by the acid phosphates contained in the partially neutralized liquor, under formation of normal phosphates of the alkaline earths and free sulfurous acid, which escape with the vapors, and the resulting syrup is practically free from sulfurous acid. The syrup consists of carbohydrates and albuminous matter, phosphate of potash, and other soluble salts, and holds in suspension phosphates of lime and magnesia.

The precipitate of the mineral salts is produced by partial neutralization as set forth, which causes part of the phosphoric anhydrid and part of the lime and magnesia to combine, forming neutral salts which are precipitated, while due to the partial neutralization the liquid still retains its acidity.

From the foregoing description it will be observed that I have invented an improved process by the practice of which both the soluble and insoluble by-products resulting from the manufacture of starch from corn may be utilized to manufacture a nutritious and wholesome cattle food.

Having now fully described my invention, what I claim as new, and desire to secure by Letters Patent is:

1. The process of manufacturing cattle food from by-products resulting from the manufacture of starch from corn, which consists in precipitating the phosphates and albuminoids in the steep water remaining after soaking the corn in a dilute solution of sulfurous acid, removing the precipitated phosphates and albuminoids from the steep water, concentrating the remaining liquid to the consistency of syrup, and mixing the precipitates and syrup.

2. The process of manufacturing cattle food from the by-products resulting from the manufacture of starch from corn, which consists in adding a neutralizing agent to the steep water remaining after soaking the corn in a dilute solution of sulfurous acid, removing from the steep water the precipitate formed by the neutralizing agent, concentrating the remaining liquid to the consistency of syrup, and mixing the precipitate and syrup with feed.

3. The process of manufacturing cattle food from by-products resulting from the manufacture of starch from corn, which consists in precipitating the phosphates and albuminoids in steep water remaining after soaking the corn in a dilute solution of sulfurous acid, removing from the steep water the precipitated phosphates and albuminoids, concentrating the remaining liquid to the consistency of syrup, mixing the precipitated phosphates and albuminoids and the syrup with wet feed, and drying the mixture.

4. The process of manufacturing cattle food from by-products resulting from the manufacture of starch from corn, which consists in adding carbonate of soda to the steep water remaining after soaking the corn in a dilute solution of sulfurous acid, heating to the boiling point, removing from the steep water the precipitate formed by the carbonate of soda, concentrating the remaining liquid to the consistency of syrup, and mixing the precipitate and syrup with feed.

5. The process of manufacturing cattle food from by-products resulting from the manufacture of starch from corn, which consists in adding hypo-chlorite of calcium to the steep water remaining after soaking the corn in dilute sulfurous acid, adding carbonate of soda, removing from the steep water the resulting precipitate, concentrating the remaining liquid, and mixing the precipitate and concentrated liquid with feed.

6. The process of manufacturing cattle food from by-products resulting from the manufacture of starch from corn, which consists in adding a neutralizing agent to and heating the steep-water remaining after soaking the corn in a dilute solution of sulfurous acid to thereby precipitate the phosphates and albuminoids removing the precipitated phosphates and albuminoids from the steep-water, concentrating the remaining liquid to the consistency of syrup, and mixing the precipitates and syrup.

7. The process of manufacturing cattle food from by-products resulting from the manufacture of starch from corn which consists in adding carbonate of soda to the steep-water remaining after soaking the corn in dilute solution of sulfurous acid, heating the solution, removing the precipitate, concentrating the remaining liquid to the consistency of syrup, and mixing the syrup with the precipitates.

8. The process of manufacturing cattle food from by-products resulting from the manufacture of starch from corn, which consists in adding a neutralizing agent to the steep water remaining after soaking the corn in a dilute solution of sulfurous acid to thereby precipitate the phosphates and albuminoids, removing the precipitated phosphates and albuminoids from the steep-water, concentrating the remaining liquid to the consistency of syrup, and then mixing the precipitates and the syrup with other food products.

9. The process of recovering soluble by-products of corn preparatory to manufacturing cattle food, which consists in adding a neutralizing agent to the steep water remaining after soaking the corn in a dilute solution of sulfurous acid to thereby precipitate the phosphates and albuminoids, removing the precipitated phosphates and albuminoids from the steep-water and then concentrating the remaining liquid to the consistency of syrup.

In testimony whereof, I sign this specification in the presence of two witnesses.

THEODOR E. BREYER.

Witnesses:
　Geo. L. Wilkinson,
　C. A. Mullen.